United States Patent [19]

Roll et al.

[11] Patent Number: 5,332,301
[45] Date of Patent: Jul. 26, 1994

[54] ABS PRESSURE REDUCTION WHEN WHEEL DECELERATION EXCEEDS A THRESHOLD RELATIVE TO VEHICLE DECELERATION

[75] Inventors: Georg Roll, Heusenstamm; Heinz-F. Ohm, Weiterstadt, both of Fed. Rep. of Germany

[73] Assignee: Fahrzeumgtechnik Ebern GmbH, Fed. Rep. of Germany

[21] Appl. No.: 28,975

[22] Filed: Mar. 10, 1993

[30] Foreign Application Priority Data

Mar. 13, 1992 [DE] Fed. Rep. of Germany ....... 4208048

[51] Int. Cl.$^5$ .......................... B60T 8/32; G01P 3/00; G05D 16/00
[52] U.S. Cl. ........................................ 303/103; 303/93
[58] Field of Search .................. 303/93, 100, 103, 108, 303/110, 115.2, DIG. 1-4; 364/426.02

[56] References Cited
U.S. PATENT DOCUMENTS

| | | | |
|---|---|---|---|
| 5,141,294 | 8/1992 | van Zanten et al. | 303/100 X |
| 5,233,528 | 8/1993 | Phipps et al. | 303/100 X |
| 5,249,850 | 10/1993 | Kampfmann et al. | 303/93 X |
| 5,249,852 | 10/1993 | Beyer et al. | 303/108 |

*Primary Examiner*—Douglas C. Butler
*Assistant Examiner*—Josie A. Ballato
*Attorney, Agent, or Firm*—Ostrolenk, Faber, Gerb & Soffen

[57] ABSTRACT

In order to avoid cyclic wheel overbraking in an antilock control system for automotive vehicles and nevertheless have assurance that each wheel is operated in optimal slippage regions for the longest possible periods of time so that, for instance, the physically maximum vehicle deceleration is obtained with high comfort control, an ABS controller (3) is provided with an additional internal auxiliary circuit (4) which, on basis of measured wheel decelerations and calculated vehicle reference decelerations superimposes, in a manner adapted to the physical circumstances, fine pressure modulations on the normal pressure modulations.

17 Claims, 10 Drawing Sheets

ABS PRESSURE REDUCTION WHEN WHEEL DECELERATION EXCEEDS A THRESHOLD RELATIVE TO VEHICLE DECELERATION

BACKGROUND OF THE INVENTION

The present invention relates to vehicular anti-lock braking systems (ABS) in general and more particularly relates to the control section thereof.

Anti-lock braking systems control braking as soon as excessive wheel slippage is detected. An ABS must satisfy the requirement that in the event of panic braking, brake pressures of all wheels which are overbraked will be so adjusted that in all phases of controlled braking, substantially maximum possible physical braking force is used. After excessive wheel slippage has been counteracted, there must be a favorable course of pressure which achieves the highest possible average braking action without commencement of wheel slippage caused by overbraking (hereinafter referred to also as "wheel speed breakdown" or "overbraking") occurring too early.

However, for reasons of safety such overbraking must occur in each case, at the latest, about 300 msec after the start of a pressure build-up phase (also referred to as "reloading phase" or "pressure ramp") in order to assure that vehicle travel is not underbraked because of the anti-lock control. If the normal loading ramp terminates after 300 msec without final wheel overloading, then ordinarily a steep search ramp is traveled over which, in the event of a low-high transition, should find a new locking pressure point as rapidly as possible.

The search ramp therefore differs from the normal loading ramp by having a larger pressure gradient with respect to time. However, particularly in the case of motorcycles, cyclic overbraking leads to a lack of braking comfort and unnecessarily long braking paths.

SUMMARY OF THE INVENTION

Accordingly, the primary object of the present invention is to create an anti-lock braking system which avoids cyclic wheel overbraking and nevertheless operates each wheel within optimal slippage regions over the longest possible periods of time so that, for instance, maximum physical deceleration of the vehicle is obtained with a high degree of control comfort.

In accordance with the instant invention, as a function of the calculated deceleration of the vehicle, estimates are made for the degree (threshold) of wheel deceleration that will, in a short time, probably lead to another wheel overbraking. Upon exceeding this threshold, fine regulation takes place in the form of stopping or slight reduction of wheel brake pressure even before there is true overbraking with attendant wheel-locking tendencies taking place.

A reduction in pressure is effected only when the wheel deceleration exceeds a threshold which is high as compared with the vehicle deceleration and at the same time other additional conditions are satisfied. In such a case, it can be assumed with certainty that the wheel braking pressure achieved is in the vicinity of the locking pressure.

If the ordinary maximum duration of the normal reloading ramp of about 300 msec terminates directly after such a pressure reduction, there is no need to activate the steep search ramp solely on the basis of an arbitrary time requirement. The point of time for activating the search ramp is therefore delayed further upon each necessary reduction in pressure (ramp retriggering).

The steepness of the search ramp depends on the vehicle deceleration achieved. With a high deceleration (in the vicinity of 1 g), it can be assumed that only a slight increase based on an increasing coefficient of friction is still possible. With extremely slight vehicle deceleration, which leads to the conclusion that there is momentarily a smooth roadbed, a transition to higher coefficients of friction is entirely conceivable so that, in the absence of breakdowns, a high slope must be selected for the search ramp in order to arrive rapidly reach maximum possible pressure maximum.

Other features and advantages of the present invention will become apparent from the following description of the invention which refers to the accompanying drawings.

DETAILED DESCRIPTION OF THE INVENTION

Figure 1:
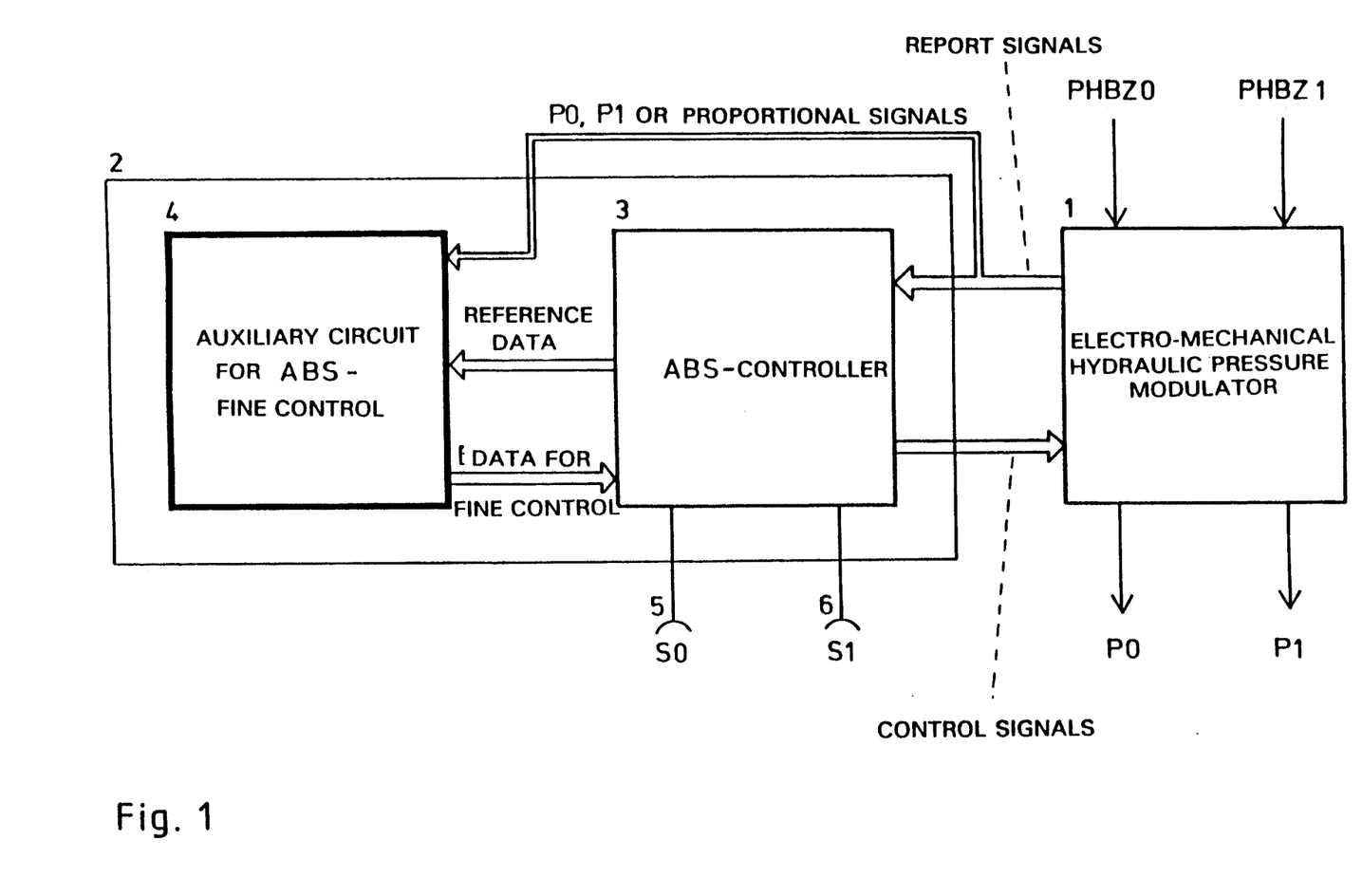
FIG. 1 is a functional block diagram of an anti-lock braking system (ABS)

Now referring to the drawings wherein FIG. 1 shows a block diagram of an anti-lock braking system including a hydraulic-electro-mechanical pressure modulator 1 and an electronic control unit 2, which, in addition to the components for the ABS controller 3, also contains an auxiliary circuit 4 for fine control. These function blocks 3, 4 can be developed both by special hardware and by software implementations.

In order to show the inclusion of the auxiliary circuit 4 into a normal anti-lock braking system, the functional relationships of the blocks (1, 3, 4) will be briefly described. For reasons of simplicity, the showing is presented for a motorcycle having two separate control channels.

ABS controller 3 receives signals from the inductive wheel sensors 5, 6 in the form of respective trains of pulses S0 and S1, and from the frequencies of the latter controller 3 directly calculates the actual circumferential speeds V0 and V1 of the two wheels of the motorcycle (not shown). From V0 and V1 the ABS controller 3 determines further internal reference signals, such as, for instance, the vehicle-reference speed VREF and the vehicle-reference deceleration AREF, so that the extent of overbraking can be recognized and controlled reliably. When overbraking occurs, ABS controller 3 feeds pressure-control signals to pressure modulator 1 so that the latter reduces master brake cylinder pressures PHBZ0 and PHBZ1 established by the driver and transmits them as wheel brake cylinder pressures P0 and P1 to a pair of brake wheel circuits. The pressure modulator 1 produces report signals that are fed to ABS controller 3. These report signals contain information concerning brake pressures P0 and P1 and, therefor, in the event of a plunger pressure modulator (see, for example, German OS 35 30 280) the pressure-determining positions of brake cylinder plungers. These internal reference or report signals can also be used by auxiliary circuit 4.

ABS controller 3 now effects the anti-lock control in accordance with known basic strategies. Parallel to this, auxiliary circuit 4 recognizes in the pressure build-up phases whether a fine adjustment is possible and controls ABS controller 3 accordingly by control signals and transmits data values to ABS controller 3 so that the latter can refine its basic control strategy with the data from auxiliary circuit 4. Therefore, ABS controller 3 and auxiliary circuit 4 operate in parallel. Since the basic functions of ABS controllers are known to those skilled in the art, such functions will not be described further in relation to ABS controller 3.

Figure 2:
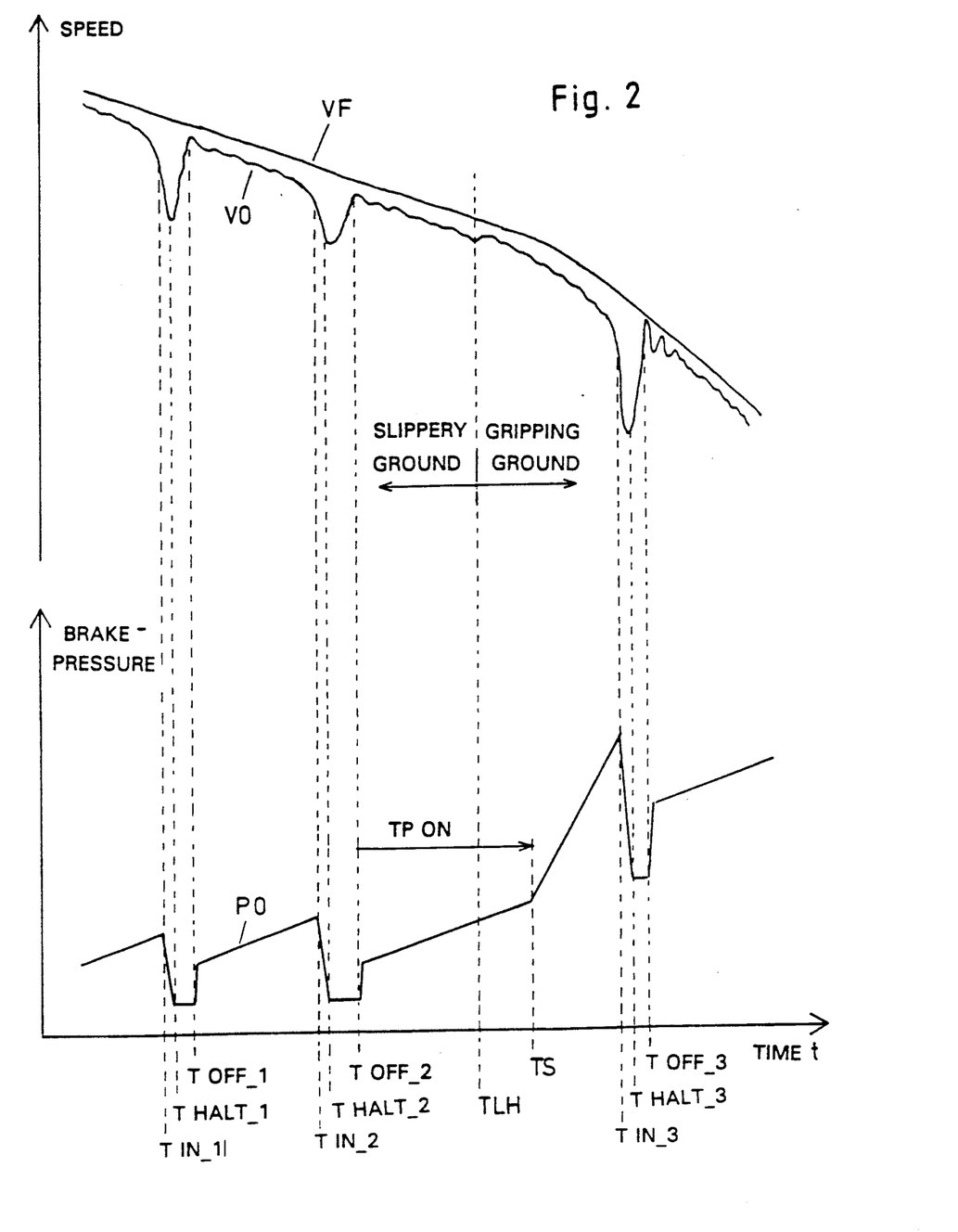
FIG. 2 is a time diagram of a typical ABS control braking with traditional systems.

The anti-lock systems employed in practice switch cyclically between the control conditions (1) "pressure release", (2) "pressure holding" and (3) "pressure build-up" on each wheel. For this, FIG. 2 shows operation an anti-lock control on a roadbed in which there is a sudden change in coefficient of friction that is reached by the wheel in question at the time TLH.

A release of pressure ordinarily takes place whenever the wheel in question exceeds a maximum permissible value of acceleration in case of sufficiently high slippage. This situation is present at each of the times T in_i.

Holding of the pressure reached takes place when the wheel passes from the prior deceleration into the acceleration phase and therefore travels again in the direction of stable slip regions (occurs at the times T halt_i). Pressure build-up takes place again when the wheel again clearly travels in stable slippage (times T Off-i), in which case generally a large pressure jump first takes place and then a continuous build-up of pressure with constant gradient ("pressure build-up phase" or "reloading phase"), until a new wheel speed breakdown caused thereby again introduces a pressure release phase. If no such breakdown takes place within a fixed, predetermined ramp duration (TR ON), then a steeper pressure ramp (search ramp) is traveled over, so that the pressure set is not too far from the possible maximum (the search ramp commences at the time TS). In practically all ABS systems, fine pressure modulations by small positive or negative amounts also take place when the wheel acceleration in the holding phase is too great or too small. In addition, pressure is maintained when the pressure enters into too large a slippage region in the reloading phase.

Figure 3:
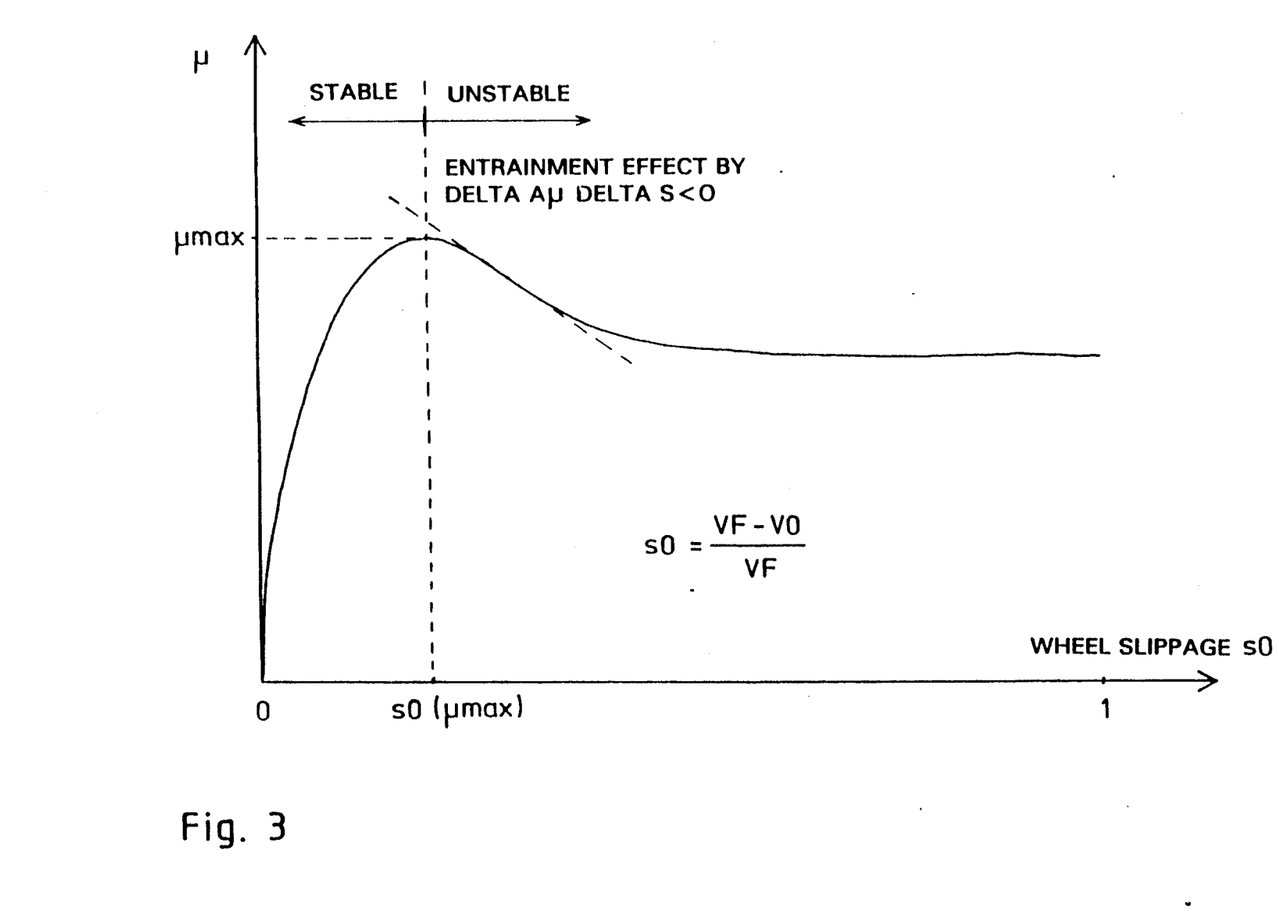
FIG. 3 is a typical $\mu$-slippage curve for dry asphalt.

In accordance with this method, if a wheel speed breakdown is recognized, there is a high degree of probability that the wheel has already passed over the peak of the $\mu$-slippage curve (FIG. 3), so that driving of the wheel caused by the roadway becomes smaller the further the wheel enters into unstable slip. Now, in order to control the wheel speed again, there must be a relatively large pressure release in order to counteract this effect.

Figure 4:
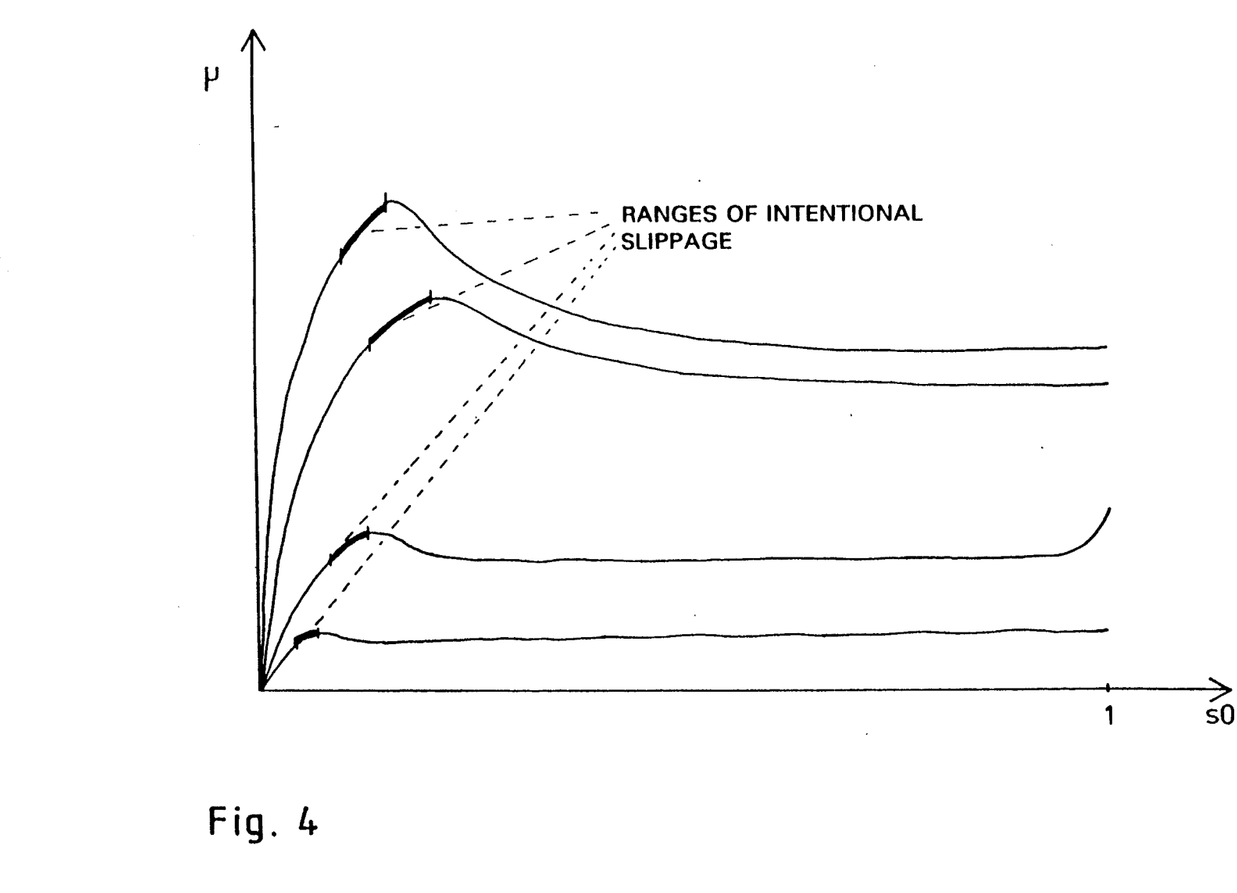
FIG. 4 shows the slippage regions strived for upon reloading.

Particularly in the case of two-wheel vehicles, strong pressure modulations result in a lack of comfort, they strain the axle mechanism and practically always lead to losses in the deceleration of the vehicle. However, with the present invention it is possible to maintain the corresponding wheel in the reloading phases just in front of the maximum of the $\mu$-slippage curve (see FIG. 4) or the longest possible periods of time, without causing a breakdown into the unstable slippage region, to assure that the coefficient of friction of the slippage is not set too far below the maximum coefficient of friction (slippage peak).

The manner of operation of the anti-lock control system of the invention will now be described. In this connection, the variables and constants used have the following meaning:

S0 = signal from the inductive front-wheel sensor which permits a determination of the actual front-wheel circumferential speed.

S1 = signal from the inductive rear-wheel sensor which permits a determination of the actual rear-wheel circumferential speed.

V0 = front-wheel instantaneous speed (an ABS controller forms the instantaneous wheel circumferential speed from the wheel-sensor signals in each control cycle).

V1 = rear-wheel instantaneous speed.

V0_alt = V0 of the previous control cycle.

A0 = filtered deceleration/acceleration of the front-wheel (this is calculated in the manner that the gradient of V0, formed from the difference of V0_alt and V0, is included proportionately in the previous value of A0).

P0 = wheel brake-cylinder pressure on the front wheel (this pressure is set upon the control braking by the ABS controller).

P1 = wheel brake-cylinder pressure on the rear wheel.

PHBZ0 = master brake-cylinder pressure of the front wheel channel

PHBZ1 = master brake-cylinder pressure of the rear wheel.

VREF = calculated vehicle reference speed (is formed from filtered wheel speeds and plausibility considerations).

AREF = filtered vehicle reference deceleration (derivative with respect to time of VREF which, because of short control cycle times, varies very greatly. For this reason, this signal is generally filtered. AREF is assumed as such a filtered vehicle deceleration.

$\mu$ = slippage-dependent coefficient of friction between tire and pavement.

s, s0 = wheel slippage (of a front wheel).

Deltas = change in slippage due to a change in the frictional force between tire and pavement.

FR = frictional force between tire and pavement; in non-overbraked condition of the wheel FR is identical to the braking force measured on the wheel circumference.

DeltaFR = change in the frictional force between tire and pavement.

VF = actual speed of vehicle (not known to the ABS controller).

SRamp0 = signal for the activating of the search ramp on the front wheel (Boolean 1-bit signal, which is always set at logical "1" when the steep loading ramp (search ramp) is to be traveled over).

PHalt0 = signal for the maintaining of pressure on the front wheel (Boolean 1-bit signal, which is always set at logical "1" when the wheel brake pressure is to be maintained in the pressure build-up phase.

PRed0 = signal for the reduction of pressure on the front wheel (Boolean 1-bit signal, which is always set at logical "1" when the wheel brake pressure in the pressure build-up phase is to be reduced by a small amount).

DeltaPSearch0 = steepness of the search ramp (for the front wheel); amount by which the brake pressure is increased in each control cycle of the search ramp.

DeltaPRed0 = amount of the pressure release upon exceeding the wheel deceleration threshold AMax2.

T in_i = time at which a wheel speed breakdown caused by overbraking is recognized for the i-th time within a control braking.

POein = brake pressure of the front wheel at which a wheel-locking tendency is noted.

POein_i = brake pressure of the front wheel at which a wheel-locking tendency occurs in a control braking for the i-th time.

PConst = small constant amount of pressure which is required to form a reference pressure.

T halt_i = time at which a pressure hold phase begins for the i-th time within a control braking and the previously overbraked wheel accelerates.

T off_i = time at which a wheel speed breakdown is compensated for the i-th time within a control braking.

TLH = time at which the wheel in question reaches a sudden change in coefficient of friction of the roadway.

TS = time at which the search ramp is activated.

Th_i = time at which maintaining of pressure in a pressure-buildup phase takes place for the i-th time within a control braking.

Tr_i = time at which fine pressure reduction is effected for the i-th time within a control braking; begin lengthening of the pressure build-up ramp.

TP on = permissible duration of the pressure build-up within which a renewed wheel locking tendency is expected.

TRMin = minimum remaining time for the normal pressure build-up if a pressure reduction has taken place during the pressure build-up.

TP on', TP on" = time of the normal pressure build-up phase after a single lengthening (two lengthenings).

AMax1 = threshold for the wheel deceleration; upon exceeding a pressure holding takes place in the pressure build-up phase.

AMax2 = threshold for the wheel deceleration; upon exceeding a pressure reduction takes place in the pressure build-up phase.

DeltaA1, DeltaA2 = deceleration portions for the calculation of AMax1 and AMax2.

K1, K2, K3, K4, K5, K6 = constants for calculating thresholds DeltaA1 and DeltaA2.

K7, KS, K9 = constants for calculating the adaptive search-ramp partiality DeltaPSearch0.

K10, K11 = constants for calculating the amount of the pressure reduction DeltaPRed0.

Jitter0 = indicating signal for front-wheel jitter (Boolean 1-bit signal which lies at logical "1" when strong jitter is noted on the front wheel or has been noted shortly before).

REO = display signal for a wheel overbraking (Boolean 1-bit signal which lies at logical "1" if an unstable slippage is present on the front wheel).

Control cycle time pulse = timing pulse which is switched with the duration of an ABS control cycle (in this case 8 msec)→125 Hz.

1 g = acceleration of gravity = 9.81 m/s$^2$.

The control mechanisms to be described can be employed separately on each vehicle wheel. In this connection, consideration as to whether a front wheel or a rear wheel is controlled can be taken into account by adjusting the constants differently. In the case of a motorcycle, one will generally endeavor to pull the rear wheel into deeper slip regions so that greater thresholds are selected for activating the fine-adjustment mechanisms on the rear-wheel channel.

In the case of the more critical front wheel, deep wheel slippage starts can be prevented by selecting smaller thresholds. In the case of passenger cars, the stability producing rear wheels can be operated by correspondingly small thresholds in more stable slippage regions.

Since in principle, the control mechanisms take place in the same way for all wheels, for the sake of simplification, the following description shall be for a front wheel (wheel index 0) only.

During the pressure build-up in the reloading phase of the wheel, its deceleration value is continuously compared with permissible threshold values AMax1 and AMax2 which, in their turn, are formed dynamically as a function of the braking situation. If the circumferential deceleration A0 of the wheel exceeds the threshold value AMax1, at first only the pressure start will be maintained. If the greater threshold value AMax2 is exceeded, there will be a small reduction in pressure dependent upon wheel deceleration.

In this connection it is not necessary for the wheel circumferential speed V0 to have reached a large slippage value. It is even assumed that this measure will be active when the wheel is still in the stable slippage range, hence less than the maximum on the slippage curve. In this way, speed breakdowns with high wheel dynamics which require a strong reduction in pressure for compensation, are frequently avoided.

Figure 6:
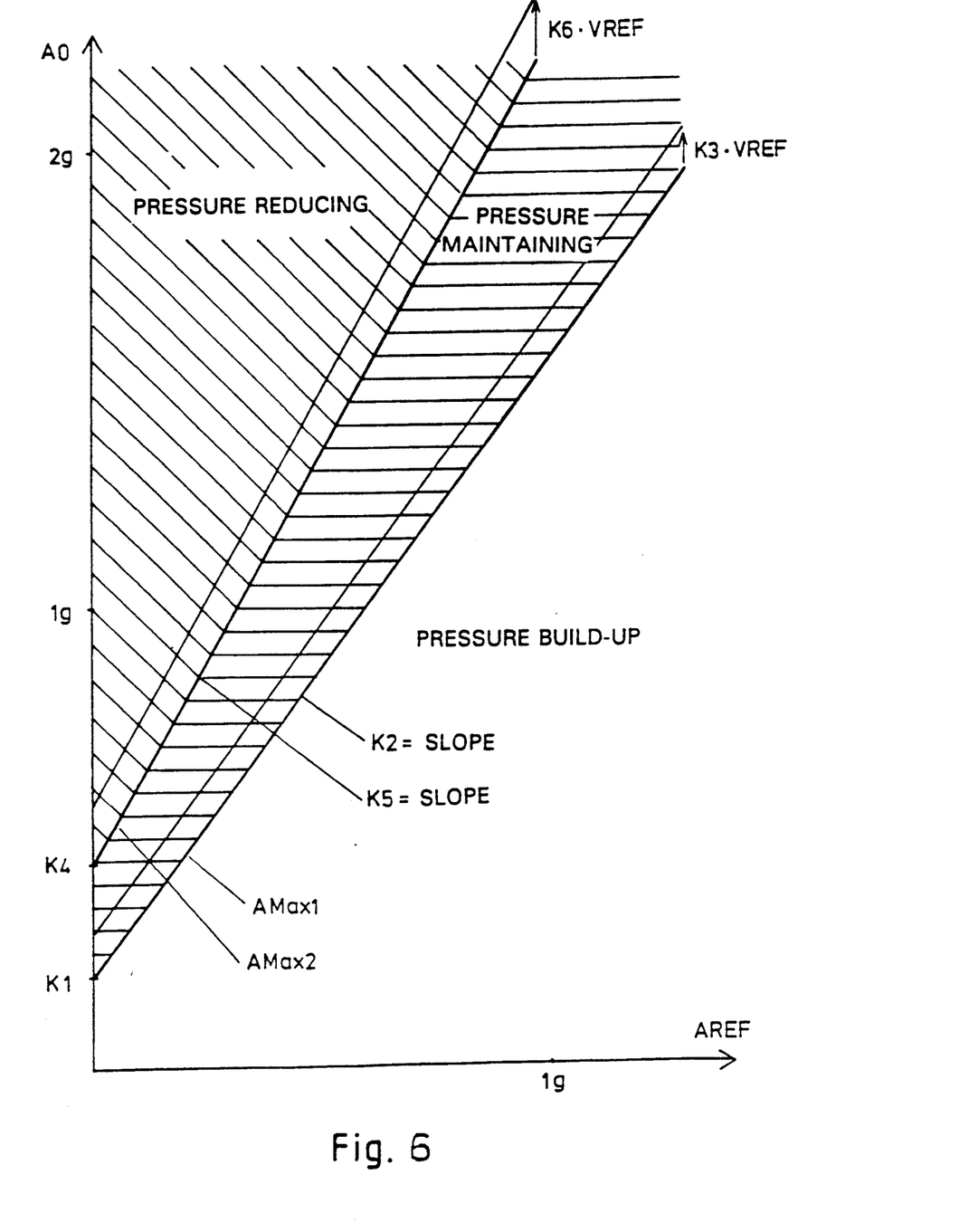
FIG. 6 shows the functions AMax1, AMax2.

The threshold values A34ax1 and A34ax2 are in this connection not constant values but are calculated as a function of the vehicle reference deceleration reached (see FIG. 6).

| | | |
|---|---|---|
| AMax1 | = | AREF + DeltaA1 |
| AMax2 with | = | AREF + DeltaA2 |
| DeltaA1 | = | K1 + K2 * AREF + K3 * VREF |
| DeltaA2 | = | K4 + K5 * AREF + K6 * VREF |

K1, K2, K3, K4, K5, K6 specific to the vehicle.

The advantage of this variable adjustment of the threshold values is that effective prevention of wheel-slippage breakdown can be obtained on all types of ground.

In accordance with the above equations, the wheel brake pressure is already maintained or even reduced when wheel speed diverges, with the difference gradient DeltaA1 or DeltaA2, from the vehicle reference speed VREF determined, without having to exceed an absolute threshold (not adapted to the situation), so that upon braking on slippery ground relatively flat slippage entrances trigger the fine adjustment measures.

In practice, it has been found that the divergence between vehicle speed and wheel speed is actually controlling as an indication of approaching condition of wheel locking.

The exact determination of speed divergence is made difficult by the fact that the vehicle reference speed VREF is obtained from wheel speeds V0 and V1. Upon strong entrance slippage of both wheels, in principle, VREF can be calculated somewhat too steeply downward and divergence appears less than it actually is. The calculation of VREF for other functions requires suitable filtering of the basic VREF information.

Setting of constants K1 to K6 must be effected in a manner specific to the wheel, since, specifically in the case of a motorcycle, very different requirements are made with respect to regulation of the two wheels. The decisive factor for the setting is also the class of tires used. In the present use of sport tires with strongly pronounced $\mu$-slippage curve maxima, the thresholds at least for the front wheel should be selected to be relatively small. In tires which are directed more towards comfort, the threshold should be selected so large that the mechanisms become active only in extreme cases.

There is also the possibility of allowing a greater or lesser dependence on speed to be included in the calculation of the threshold. In this way, the fact is taken into account that at higher speeds stronger divergences can occur between vehicle speed and wheel speed without this having to be considered an indication of a tendency towards locking. Uncalculated action for maintaining or even slightly reducing brake pressure at high speeds would be too dangerous due to possible lengthening of the braking path. Furthermore, a fine adjustment in the high speed range is only of minor importance to obtain greater comfort.

As mentioned above, a reduction in the wheel braking pressure takes place when the wheel deceleration A0 exceeds the deceleration threshold value AMax2. The amount of this reduction is proportional to the size of the last unfiltered wheel speed gradient:

$$DeltaPRed0 = K10 * (V0\_alt - V0)$$

In this connection, V0_alt is the wheel circumferential speed V0 of the previous control cycle.

Since the reduction must not assume just any value, a limitation is effected to the maximum value K11:

$$DeltaPRed0 = Min(K10 * (V0\_alt - V0), K11)$$

For instance, in the case of a point wheel-speed gradient of 3 g to effect a single pressure reduction by 1 bar, K10 is calculated in the case of a control cycle time of 8 msec as:

$$K10 = 1 \text{ bar}/(3 g * 8 \text{ msec})$$

The slope DeltaPRed0 must be transformed into suitable control signals, depending on the pressure modulator used. The slope DeltaPRed0 can be converted linearly into a distance range of the pressure piston which is to be moved over.

Figure 5:
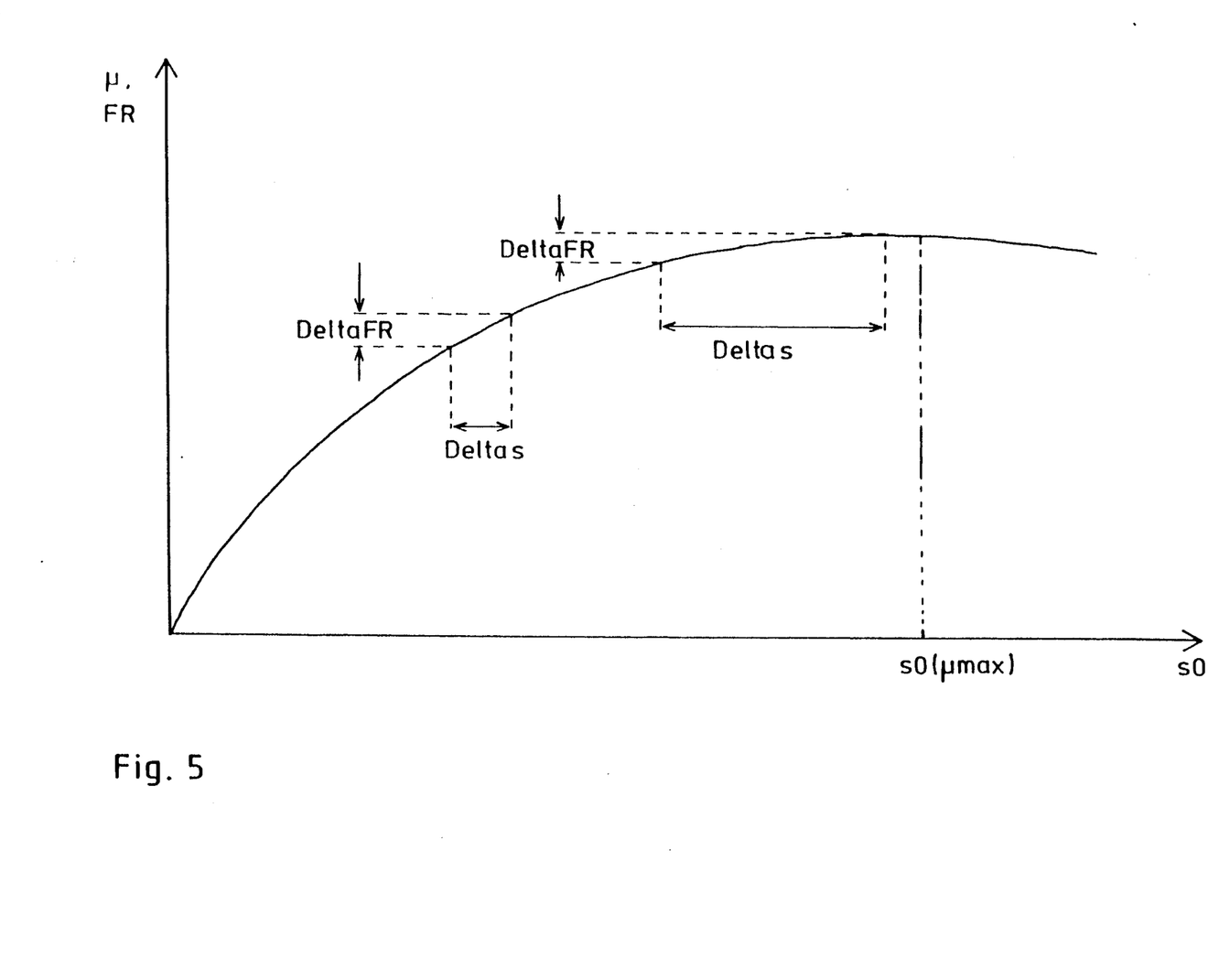
FIG. 5 shows the increase in slippage upon increase in pressure as a function of the closeness of the slippage reached to the optimum slippage.

The lower region of a typical $\mu$-slippage curve or braking force slippage curve is shown in FIG. 5 where it is seen that for very small slippage values, upon increase of the friction force by a small amount DeltaFR, the slippage also increases only by an amount Delta s. In the vicinity of the slippage peak, Delta s becomes substantially greater with the same increase in friction force. Because of this, upon braking in the region of the optimum friction value, strong slippage variations, as well as wheel-speed variations, take place both in increasing and in decreasing directions. This effect makes the above-described fine control possible, since a high point wheel deceleration, despite slow pressure start, is evaluated as an indication that the vicinity of the slippage peak has been reached.

If pressure is maintained or reduced on substantially uniform ground, in due time it is possible to operate the wheel for a long time in this optimal region, for which, as shown in FIG. 5, only very slight pressure modulations are necessary.

The control mechanisms described for maintaining and reducing brake pressure should be carried out only when there is assurance that the high wheel decelerations are not simulated for a short time due to wheel jitter caused by the ground. For this, wheel jitter can be measured by means of different known methods. Here, it is assumed that the actual ABS controller 3 carries out a jitter measurement and the auxiliary circuit 4 indicates, via a logical "1" on the signal jitter 0, that wheel disquiet is still present. In this case, no fine adjustment takes place.

In order to create further certainty that a fine control is justified, one can also establish the requirement that the existing wheel brake pressure has again, at least approximately, reached the previous wheel locking pressure and one can thus assume, under uniform conditions, that the wheel is again being operated close to the locking pressure.

If a slight pressure reduction due to an excessively high wheel deceleration was necessary within the reloading ramp, the duration of the reloading ramp which still remains is at the same time lengthened to a minimum remaining time TRMin, if the latter has already been dropped below. This measure is meaningful since the necessity of pressure reduction is an indication that the wheel brake pressure reached is very close to the locking pressure, and therefore to the maximum meaningful pressure, so that the flat loading ramp can definitely still be traveled over for a certain minimum period of time without fear of underbraking. In such a case, there is no need for prompt activation of the steep search ramp.

Here, it is assumed that upon the occurrence of an individual point pressure reduction, a constant minimum remaining time TRMin for the normal pressure build-up ramp of about 80 msec is set. If the ordinary remaining time is still greater than TRMin, the remaining time remains unchanged, so that this measure can fundamentally act only to lengthen the phase.

In order to make certain that no definite underbraking takes place due to a delay in connecting of the search ramp while operating on slippery, slightly uneven ground with subsequent transition to high friction values, it is also possible to permit lengthening of the normal pressure buildup phase only when at least a minimal vehicle deceleration of, for instance, 0.3 g is exceeded. An event-caused lengthening of the flat reloading ramp therefore takes place (ramp retriggering).

Figure 7:
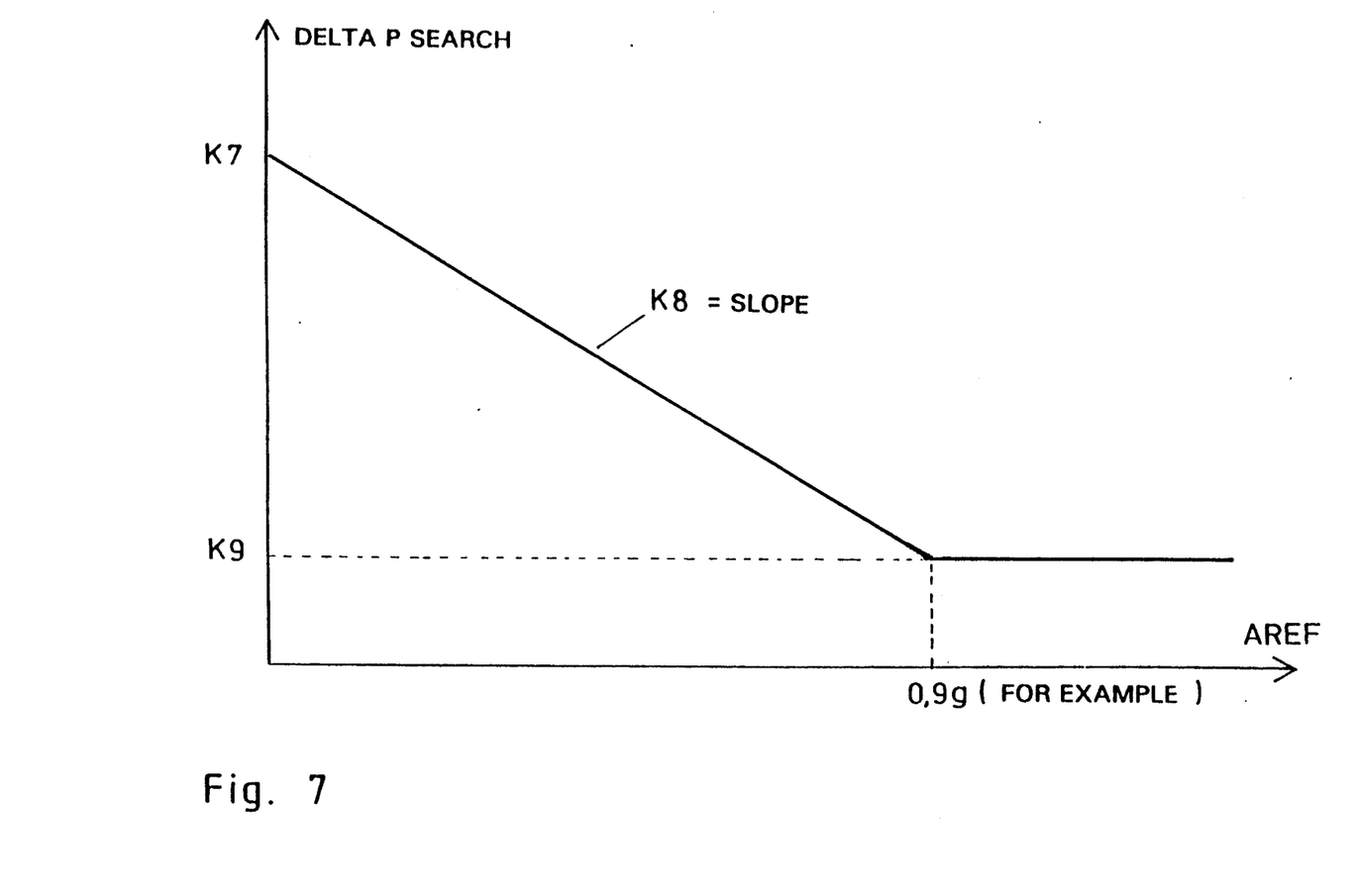
FIG. 7 shows the function DeltaPSearch.

After expiration of the time for the normal reloading ramp, a generally clearly steeper search ramp is traveled over as a safety measure in order to reach the actual wheel-locking pressure as rapidly as possible. The steepness of this ramp should logically not be selected to be constant, since only upon slight vehicle deceleration can a clear increase still be expected on the basis of a possible increase in friction. In such cases, in order not to underbrake, the steepness of the search ramp must be great. However, if actual vehicle deceleration lies in the vicinity of the physically maximum possible value of about 1 g, no great increase can be expected any longer, and the brake pressure set cannot be far from the locking pressure. Accordingly, a steep ramp need not be traveled over in order to arrive rapidly at the optimal pressure point. From these considerations, there results a slope of the search ramp which is directly linearly dependent on the deceleration of the vehicle (adapted slope of the search ramp) (see FIG. 7):

$$DeltaPSearch0 = K7 - K8 * AREF$$

The calculated DeltaPSearch0 is also limited to a minimum value K9 even under extreme deceleration (uphill braking on dry asphalt):

$$DeltaPSearch0 >= K9$$

If the vehicle deceleration upon braking on smooth ground is very slight, and AREF therefore strives towards 0, DeltaPSearch0 is determined practically only by the base value K7. The latter should be selected so that, upon an extreme transition from coefficient of friction $\mu=0$ to $\mu=1$, a given pressure-build-up time (for instance, 500 msec) is not exceeded.

Assuming that the locking brake pressure of a motorcycle front wheel on ground with $\mu=1$ amounts to about 25 bar, we have, with a control cycle time of 8 msec:

$$K7 = 25 \text{ bar} * 8 \text{ msec}/50 \text{ msec} = 0.4 \text{ bar}$$

If the slope of the search ramp DeltaPSearch0 for AREF = 1 g, still assumes only a residual value of, for instance 0.04 bar, then we have:

$$K8 = 0.36 \text{ bar}/1 \text{ g}$$

In order that DeltaPSearch0 does not drop below this value upon extreme decelerations, the minimal slope K9 must be:

$$K9 = 0.04 \text{ bar}.$$

For the control of pressure modulator 1 to obtain the pressure build-up with the gradient DeltaPSearch0, what is stated above with respect to DeltaPRed0 applies.

Figure 8:
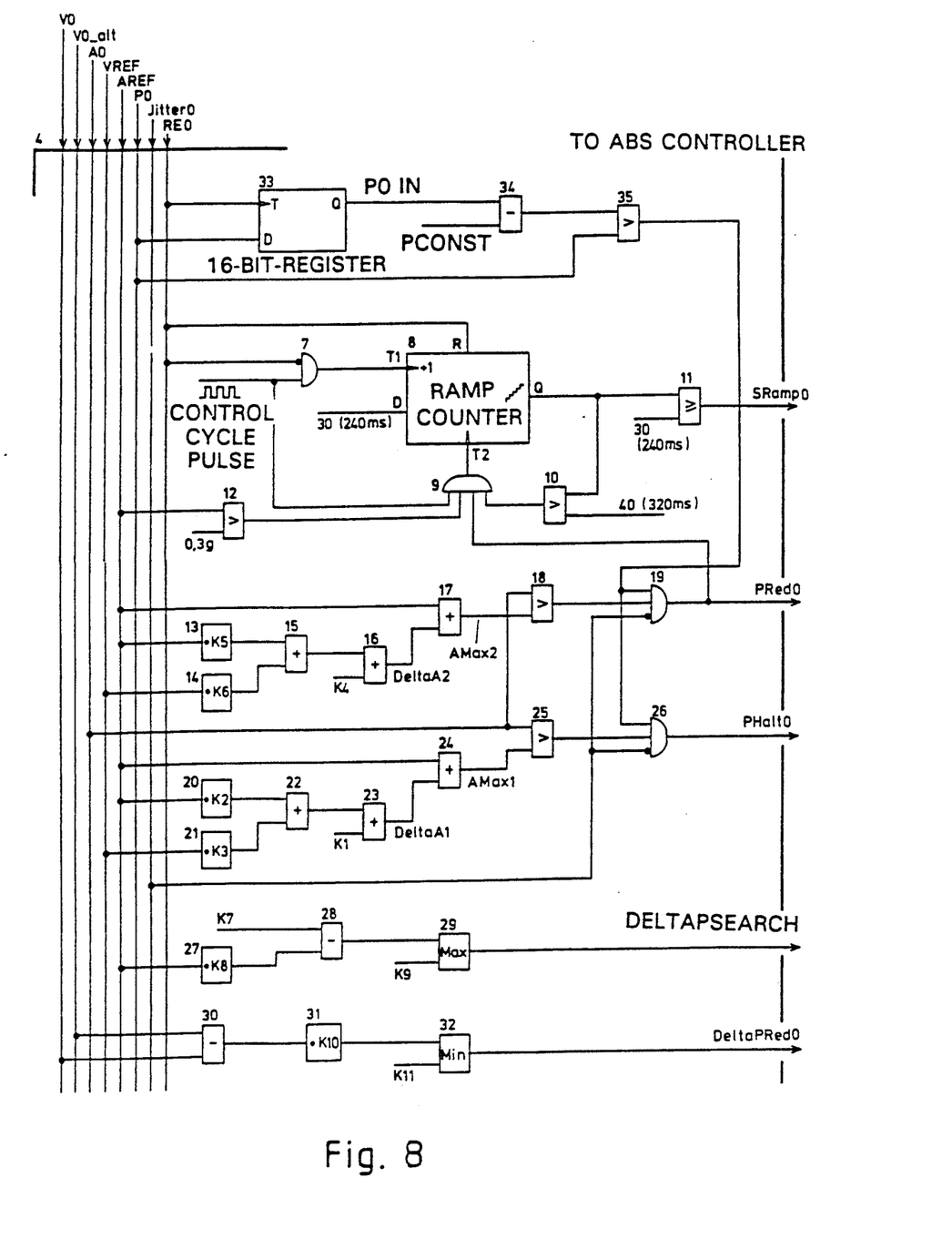
FIG. 8 shows a circuit for realizing the adaptive reloading ramp.

FIG. 8 shows an embodiment constructed in accordance with the invention wherein auxiliary circuit 4 receives internal reference signals which ABS controller 3 generates, and itself also requires. Since here only the front wheel is considered, these signals are the vehicle reference speed VREF, the vehicle reference deceleration AREF, the front wheel speed V0, the previous regulation cycle V0_alt, the filtered front-wheel deceleration A0, the front wheel brake pressure P0 (or the front wheel plunger setting in the case of plunger modulators), a jitter indication signal Jitter0, as well as a signal RE0 which indicates whether, at the time, the front wheel is traveling in unstable slippage, and if it is regulation takes place.

Auxiliary circuit 4, on its part, produces from these signals control signals and data which are required by the ABS controller 3 in order to effect fine adjustment. Of concern here are the signals SRamp0 for starting of the search ramp, PHalt0 for maintaining of the pressure, and PRed0 for the reduction of the pressure during the pressure build-up phase, as well as 8-bit data words DeltaPSearch0 and DeltaPRed0. In the event that auxiliary circuit 4 activates a search ramp, the value of DeltaPSearch applies as the amount of pressure by which ABS controller 3 must, in the existing control cycle, increase the brake pressure of the front wheel channel. If the signal PRed0 is set, DeltaPRed0 represents the amount of pressure by which the ABS controller must reduce the front-wheel brake pressure.

One essential element for the setting of the pressure build-up gradient is ramp counter 8. This is an 8-bit counter which is incremented by 1 by positive signal flanks on the T1 input and is decremented by a "1-level" at the R input to the level 0. A positive signal flank at the T2 input effects the taking over of the value present at the D input as an actual counter reading. This appears towards the outside on the Q output.

Whenever a wheel speed breakdown caused by overbraking occurs, the signal RE0 lies at logical "1" and sets ramp counter 8 continuously to the initial value 0. After controlling the overbraking, the pressure build-up phase commences and the signal RE0 becomes "0". The control cycle pulse passes via AND gate 7 to the T1 input of counter 8, the reading of which is now incremented by 1 with each control cycle. When 40 control cycles (of 8 msec each) have passed in the pressure build-up phase without another wheel overbraking having occurred, the comparator 10 supplies a logical "1" at its output and thus connects the signal SRamp0 to "1", so that ABS controller 3 is advised that now the steep search ramp must be traveled over. Ordinarily, for a duration of about 40 * 8 msec = 320 msec, the pressure build-up ramp extends with a pressure gradient which ABS controller 3 either calculates or establishes as constant.

This function is now supplemented by a control mechanism for lengthening the build-up ramp time. As described above, the normal pressure build-up phase is still to be maintained for a minimum remaining time TRMin if auxiliary circuit 4 has recognized that in the pressure build-up phase a slight pressure reduction for fine adjustment is necessary. In this case, the control signal PRed0 (see below) is set to logical "1" so that, via AND gate 9, the control cycle pulse can reach the T2 input of ramp counter 8, as a result of which the reading of counter 8 is again set back to the constant value 30 present at the D input. This means that comparator 10 can now actively switch the search ramp only after an additional 10 control cycles. Taking over of the counter reading 30 is only to occur when the actual counter reading has already exceeded 30 since otherwise a shortening of the pressure build-up phase or premature activation of the search ramp would take place. Therefore, comparator 11 blocks AND gate 9 when the counter reading is still less than 30. Furthermore, no delaying of the search ramp should take place if the vehicle reference deceleration AREF assumes a value that is too small. This is checked by comparator 12 which also blocks AND gate 9 if AREF drops below, for instance, 0.2 g.

If the search ramp has, nevertheless, been started due to a lack of wheel locking tendencies (SRamp0="1"), ABS controller 3 assumes as a slope for this pressure ramp the value DeltaPSearch (FIG. 7), which is calculated via the components 27, 28, 29 in accordance with the function described above, in the manner that the multiplier 27 standardizes AREF by a conversion factor KS, the subtractor 28 deducts this value from the maximum slope K7, and the maximum former 29 limits this difference to the minimum slope K9.

The components 20–26 test whether, during the pressure build-up phase, filtered wheel deceleration A0 exceeds the threshold value AMax1. For this purpose, constant multipliers 20 and 21, as well as adders 22, 23 and 24, form the AMax1 function. If wheel deceleration A0 exceeds the value of AMax1, comparator 25 switches a "1" to AND gate 26, which at precisely that time sets the signal PHalt0 at its output to "1". If, in addition, no serious wheel jitter is present (Jitter0="0"), components 33, 34 and 35 establish that the pressure reached is again in the vicinity of the previous wheel locking pressure. For this purpose the 16-bit register 33 stores pressure value P0, which is present exactly at the time that the signal RE0 changes from "0" to "1". This is the case precisely when ABS controller 3 clearly notes a wheel-locking tendency. The stored value P0ein is also reduced by a small constant amount Pconst by subtractor 34. If the instantaneous brake pressure P0 now exceeds reference value P0ein−Pconst, and a sufficiently high wheel brake pressure is again present, comparator 35 switches its output to "1" thereby permitting signal PHalt0 to be set via AND gate 26.

This signal enables ABS controller 3 to maintain brake pressure P0, although the pressure build-up phase is regularly active. At the same time, components 13–19 check whether the filtered wheel deceleration A0 exceeds the larger threshold value AMax2 during the pressure-build-up phase. For this purpose, constant multipliers 13 and 14 and adders 15, 16 and 17 form the AMax2 function.

If wheel deceleration A0 exceeds the value of AMax2, comparator 18 switches a "1" to AND gate 19, which then sets signal PRed0 at its output to "1" precisely when no serious wheel jitter is again present and the pressure P0 has again reached sufficiently high values.

If signal PRed0 indicates to ABS controller 3 by a logical "1" that it should reduce brake pressure slightly despite the active pressure build-up phase, ABS controller 3 takes over value DeltaPRed0 as the amount for pressure reduction. In accordance with the function described above this 8-bit value is formed by components 30, 31 and 32 from the point wheel speed gradient. That is subtractor 30 subtracts the actual wheel speed V0 from the wheel speed of the previous control cycle V0_alt, multiplier 31 standardizes the difference by a conversion factor K10, and minimum former 32 limits the value to a maximum value K11.

Figure 9:
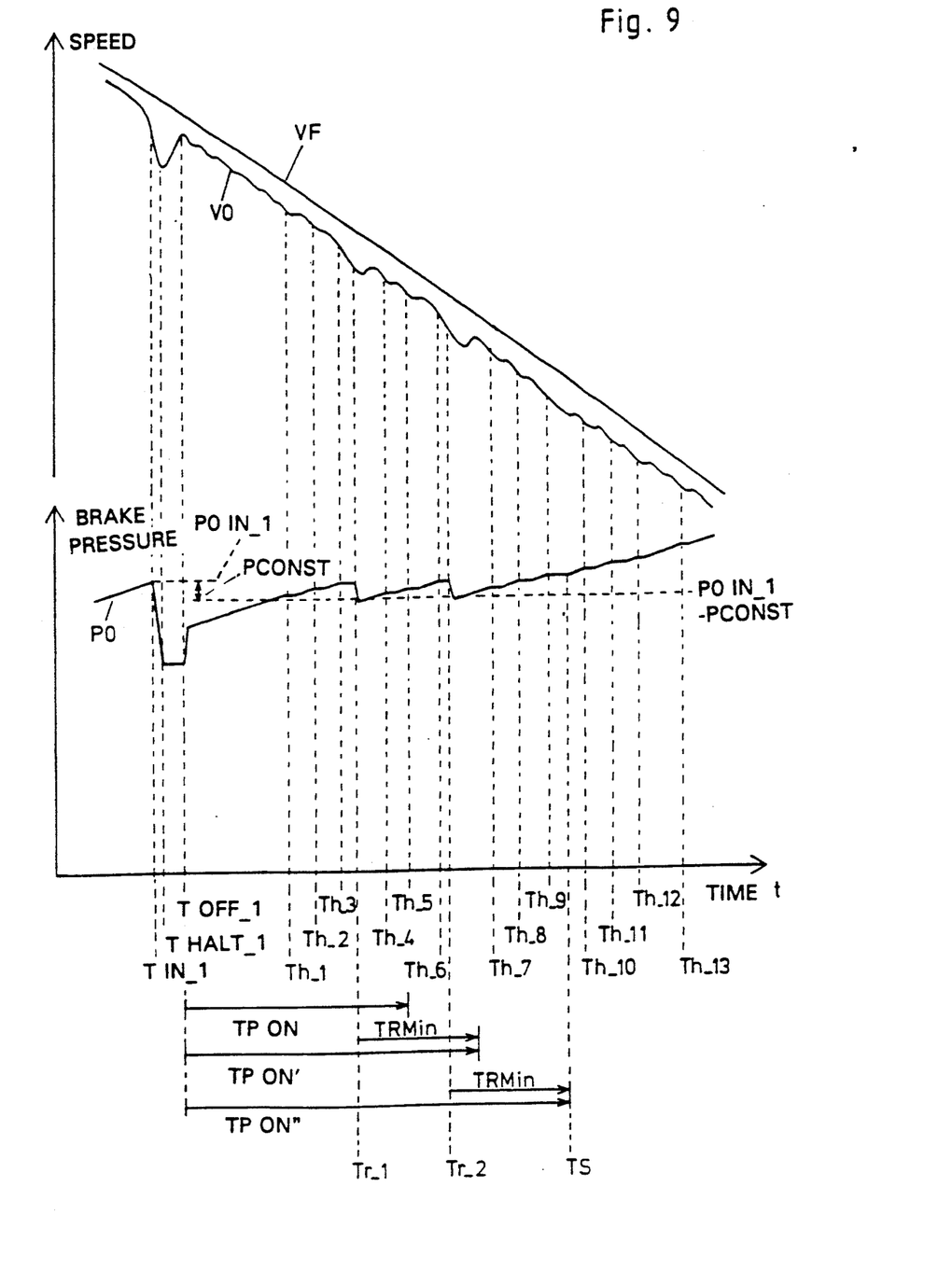
FIG. 9 is a time diagram for fine adjustment: reloading ramp with pressure holding and reducing cycles.

FIG. 9 shows, by way of example, a portion of ABS control braking in which the control mechanisms of fine control and delay of the search ramp activation described here are active. Since ABS controller 3 does not note any serious wheel jitter, a fine control may take place in the pressure build-up phase as soon as P0 exceeds the value P0ein−Pconst. At times Tr_1 and Tr_2, brake pressure P0 is reduced by small amounts despite an active pressure build-up phase. In this connection, wheel travel is close to the slippage curve maximum, as the slight wheel peak jitter shows.

At both of these times, the duration of the normal pressure build-up phase is so lengthened in each case that a residual time of TRMin remains in each case. In this way, the total duration of the pressure build-up ramp is lengthened from TP On first of all to TP on' and later to TP on", and the optimal braking condition is retained for a long time.

After time TS, the search ramp is finally activated. However, its slope is not greater than the normal ramp slope, since, in the example shown, a very high vehicle deceleration within the limit region has already been reached.

Figure 10:
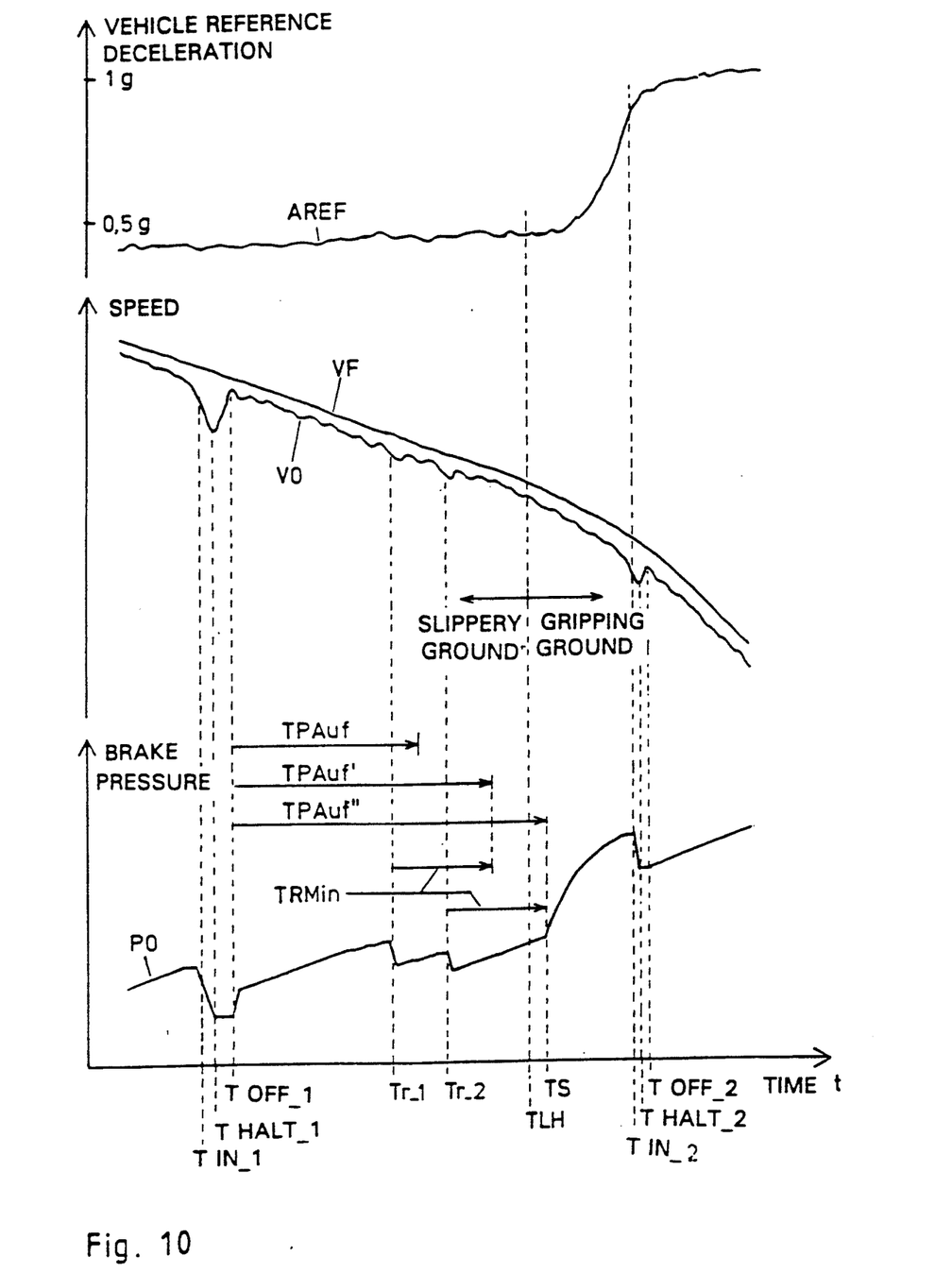
FIG. 10 is a time diagram for low-high $\mu$-transition: reloading ramp and search ramp with deceleration-dependent slope.

FIG. 10 shows ABS control braking on a roadbed with sudden positive increase in friction. Since, within the pressure build-up phase commencing with T off_1 within the lengthened pressure build-up time, no wheel-locking tendency can be noted, the search ramp is activated at the time TS. Because of the very slight vehicle reference deceleration AREF the slope of the ramp is at first very large. Due to the steep pressure rise and the ground of good adherence, the deceleration also increases sharply. In order thereupon not to obtain a wheel-locking process caused with high dynamics, the pressure build-up gradient is continuously reduced by the increasing AREF so that the optimal pressure point (new wheel-locking pressure) is finally approached with only slight dynamics. The wheel-locking tendency can then be eliminated by slight pressure modulation at the time T in_2.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An anti-lock braking control system for automotive vehicles, said system including:
   first and second inductive sensors (5, 6) that generate signals indicative of conditions at wheels of a vehicle having said system,
   an ABS controller (3) which recognizes conditions of wheel overbraking from said signals and produces corresponding control signals, and
   a pressure modulator (1) which is caused by the control signals to adjust the brake pressures on the wheels of said vehicle, with first and second and third pressure-setting phases being passed cyclically through to each wheel so that when overbraking is recognized, in each case a pressure reduction takes place, and when sufficient wheel acceleration occurs again pressure maintenance is effected, and
   after the wheel enters a stable slippage region a pressure build-up again takes place until another overbraking again introduces a pressure reduction phase, with steepness of the pressure build-up being increased abruptly by activation of a search ramp if the pressure build-up does not lead to overbraking of the wheel, within a predetermined period of time TP on;

the ABS controller (3) being provided with an additional internal auxiliary circuit (4) which, on the basis of measured wheel decelerations and calculated vehicle reference decelerations AREF, superimposes adaptively in relation to physical circumstances, a fine pressure modulation on the normal pressure modulations;

for each controlled wheel, the auxiliary circuit (4) produces a pressure-maintenance signal if wheel deceleration is greater than the vehicle reference deceleration increased by a threshold DeltaA1, and produces a pressure reduction signal if wheel deceleration is greater than the vehicle reference deceleration increased by a threshold DeltaA2 (DeltaA2 > DeltaA1), whereby:

the ABS controller maintains the brake pressure of the wheel in question or even reduces it when wheel 40 speed is still in a stable slippage region;

the auxiliary circuit (4) increases the time TS for activating of the search ramp in the absence of a wheel-locking tendency whenever a pressure-release signal has been given during the pressure build-up; and as a function of the vehicle reference deceleration AREF reached the auxiliary circuit (4), currently calculates a variable slope DeltaPSearch for the search ramp, with the variable slope decreasing as AREF increases.

2. An anti-lock braking control system according to claim 1, characterized by the fact that the auxiliary circuit (4) calculates the thresholds DeltaA1 and Delta A2 as a function of the calculated vehicle reference deceleration AREF.

3. An anti-lock braking control system according to claim 2, characterized by the fact that wheel-brake pressure is stored as a reference pressure at which the wheel in question shows a tendency towards locking; and that maintaining of wheel brake pressure is effected despite exceeding of the threshold DeltaA1 or a pressure reduction is effected despite exceeding of the threshold DeltaA2, only when, in addition, the condition is satisfied that the brake pressure set has again approximately reached or already exceeded the reference pressure.

4. An anti-lock braking control system according to claim 2, characterized by the fact that maintaining of pressure is effected despite exceeding the threshold DeltaA1 or a pressure reduction is effected despite exceeding of the threshold DeltaA2 only if, in addition, the condition is satisfied that a bad road is not present and therefore already a given time after the last recognized wheel jitter has passed.

5. An anti-lock braking control system according to claim 2, characterized by the fact that the auxiliary circuit (4) is implemented by software on the ABS controller (3).

6. An anti-lock braking control system according to claim 1, characterized by the fact that the auxiliary circuit (4) also calculates the thresholds DeltaA1 and DeltaA2 as a function of the calculated vehicle reference speed VREF with DeltaA1 and DeltaA2 increasing linearly or progressively with VREF.

7. An anti-lock braking control system according to claim 6, characterized by the fact that wheel-brake pressure is stored as a reference pressure at which the wheel in question shows a tendency towards locking; and that maintaining of wheel brake pressure is effected despite exceeding of the threshold DeltaA1 or a pressure reduction is effected despite exceeding of the threshold DeltaA2, only when, in addition, the condition is satisfied that the brake pressure set has again approximately reached or already exceeded the reference pressure.

8. An anti-lock braking control system according to claim 6, characterized by the fact that maintaining of pressure is effected despite exceeding the threshold DeltaA1 or a pressure reduction is effected despite exceeding of the threshold DeltaA2 only if, in addition, the condition is satisfied that a bad road is not present and therefore already a given time after the last recognized wheel jitter has passed.

9. An anti-lock braking control system according to claim 6, characterized by the fact that the auxiliary circuit (4) is implemented by software on the ABS controller (3).

10. An anti-lock braking control system according to claim 1, characterized by the fact that wheel-brake pressure is stored as a reference pressure at which the wheel in question shows a tendency towards locking; and that maintaining of wheel brake pressure is effected despite exceeding of the threshold DeltaA1 or a pressure reduction is effected despite exceeding of the threshold DeltaA2, only when, in addition, the condition is satisfied that the brake pressure set has again approximately reached or already exceeded the reference pressure.

11. An anti-lock braking control system according to claim 10, characterized by the fact that maintaining of pressure is effected despite exceeding the threshold DeltaA1 or a pressure reduction is effected despite exceeding of the threshold DeltaA2 only if, in addition, the condition is satisfied that a bad road is not present and therefore already a given time after the last recognized wheel jitter has passed.

12. An anti-lock braking control system according to claim 10, characterized by the fact that the auxiliary circuit (4) is implemented by software on the ABS controller (3).

13. An anti-lock braking control system according to claim 1, characterized by the fact that maintaining of pressure is effected despite exceeding the threshold DeltaA1 or a pressure reduction is effected despite exceeding of the threshold DeltaA2 only if, in addition, the condition is satisfied that a bad road is not present and therefore already a given time after the last recognized wheel jitter has passed.

14. An anti-lock braking control system according to claim 13, characterized by the fact that the auxiliary circuit (4) is implemented by software on the ABS controller (3).

15. An anti-lock braking control system according to claim 1, characterized by the fact that the increase of TP On after a pressure reduction takes place only if, at the same time, the vehicle reference deceleration AREF exceeds a minimum threshold of, for instance, 0.3 g.

16. An anti-lock braking control system according to claim 15, characterized by the fact that the auxiliary circuit (4) is implemented by software on the ABS controller (3).

17. An anti-lock braking control system according to claim 1, characterized by the fact that the auxiliary circuit (4) is implemented by software on the ABS controller (3).

* * * * *